United States Patent
Surendrakumar (10) Patent No.: US 9,680,705 B2
(45) Date of Patent: Jun. 13, 2017

(54) COMPETENCY BASED DEVICE ACCESS

(71) Applicant: Halogen Software Inc., Kanata (CA)

(72) Inventor: Richard Surendrakumar, Ottawa (CA)

(73) Assignee: HALOGEN SOFTWARE INC., Kanata, Ontario (CA)

( * ) Notice: Subject to any disclaimer, the term of this patent is extended or adjusted under 35 U.S.C. 154(b) by 0 days.

(21) Appl. No.: 14/583,284

(22) Filed: Dec. 26, 2014

(65) Prior Publication Data

US 2016/0191519 A1   Jun. 30, 2016

(51) Int. Cl.
G06F 7/04 (2006.01)
H04L 12/24 (2006.01)
H04L 29/06 (2006.01)

(52) U.S. Cl.
CPC ........ H04L 41/0816 (2013.01); H04L 63/083 (2013.01); H04L 63/0876 (2013.01); H04L 63/10 (2013.01); H04L 63/105 (2013.01)

(58) Field of Classification Search
CPC .. H04L 63/0869; H04L 63/10; H04L 41/0816
USPC .......................................................... 726/7
See application file for complete search history.

(56) References Cited

U.S. PATENT DOCUMENTS

| | | | |
|---|---|---|---|
| 8,972,533 B1* | 3/2015 | Roka | H04L 67/36 348/734 |
| 2010/0169443 A1* | 7/2010 | Roundtree | G06Q 10/107 709/206 |
| 2010/0234009 A1* | 9/2010 | Antani | G06F 17/30017 455/419 |
| 2012/0054847 A1* | 3/2012 | Schultz | G06F 21/33 726/9 |
| 2014/0075493 A1* | 3/2014 | Krishnan | G06F 21/31 726/1 |
| 2014/0109178 A1* | 4/2014 | Barton | G06F 9/45533 726/1 |
| 2015/0153982 A1* | 6/2015 | Berarducci | H04N 1/00 358/1.15 |

* cited by examiner

Primary Examiner — Mohammad W Reza
(74) Attorney, Agent, or Firm — Nixon & Vanderhye P.C.

(57) ABSTRACT

A system and method are provided to enable competency based device access. The ability for a user to use a particular device may require demonstration of a skill or competency. Access control can be provided for a device to limit user access and to configure the device based upon the user competencies to utilize or perform functions on the device. The competency of the user can be defined in a competency checklist used to determine the skill or certifications of a user maintained by a resource management system.

19 Claims, 6 Drawing Sheets

COMPETENCY BASED DEVICE ACCESS

TECHNICAL FIELD

The present disclosure related to device access control and in particular to configuring devices for access by a user based upon competency.

BACKGROUND

In heavily regulated industries like healthcare, pharmaceutical, nuclear engineering etc., employees need to demonstrate certain competencies and need to complete necessary training before being allowed access to certain types of equipment and systems. The process of assessment of the employee and configuring access devices are separate or manual processes requiring collection of assessment data and configuration of the device to ensure the user can only access functions associated with their competency. Managing and facilitating device access is complex and prone to errors. The process can be inefficient and does not easily allow dynamic changes in user access.

Accordingly, improved systems and methods that enable competency based device access remain highly desirable.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-6.

In accordance with an aspect of the present disclosure there is provided a method of device access control, the method comprising: receiving user credentials and a device identifier associated with a user of a device; determining user competencies associated with the credentials for the user; determining configuration parameters for the device using the determined user competencies; and sending a device configuration based upon the determined device configuration parameters to the device for configuring the device based upon associated user competencies.

In accordance with another aspect of the present disclosure there is provided a system for device access control comprising: a device comprising: a network interface coupled to a communication network; a memory; and a processor coupled to the memory, the processor executing instructions from the memory for sending through the communication network a received user identifier from a user and a device identifier, the device providing functions having associated access control restrictions associated therewith; a server comprising: a network interface coupled to a communication network; a memory; and a processor coupled to the memory, the processor executing instructions from the memory for receiving the user identifier and the device identifier from the device coupled to the network, the processor determining one or more parameters for configuring the device providing the user identifier, the parameters determined based upon competencies determined for the associated user stored in the server, the competencies defining a level of skill determined for the user by a competency checklist wherein access to the device by the user is disabled until competencies associated with the user are determined and the parameters are provided to the device.

In accordance with yet another aspect of the present disclosure there is provided a method of device access control, the method comprising: receiving user credentials and a device identifier associated with a user of a device; sending the user credentials and device identifier to a server coupled to a network; receiving a response from the server identifying a permission level associated with the user, the permission level determined by one or more competencies demonstrated by the user and stored in the server; and configuring the device based upon the received permission level to provide access to one or more functions mapped to the one or more demonstrated competencies.

The system provides competency based device access which automates the process of tying competency assessment and demonstration to access control of certain devices, equipment and systems in highly regulated industries. The 'human element' is removed from access control procedures followed by certain companies to regulate access to employees to certain devices, equipment and systems. A competency is a set of defined behaviors that provide a structured guide enabling the identification, evaluation and development of the behaviors in individual employees and can be utilized to determine an employee's ability to perform specific tasks. In current system someone needs to manually go through competency checklists of all employees, ensure that the necessary compliance to a certain standard/regulatory body has been met. They would then have to extract the names of employees that could use the device, equipment or the system and program access for those employees. Based on the compliance level of the employee, each employee may be assigned a different level of access to the device. The employees are notified about the access and provided unique keys that would identify the employee's credentials each time the employee accessed the device, equipment or system. At a later stage, if an employee fails to achieve compliance or demonstrate the required competency, the administrator would have to be notified of this change. The administrator needs to manually program the device/equipment/system to revoke the employee's access to the system. The requirements for manual intervention can result in errors in administration and delays in updating access.

The disclosed systems and methods provide real-time access control to devices/equipment/systems based on user competencies. The competencies can be based upon qualification criteria specified in competency checklists. These qualification criteria are evaluated by a business rules engine based on business rules defined for specific industries, customers and devices/equipment to determine access to a device or functions of the device. Customer (Industry) specific competency checklists can be created and defined in a resource management system and mapped to operation of associated devices. The checklists capture competency criteria for an employee for a variety of tasks and also capture information about how these competencies were demonstrated by the employee.

Figure 1:
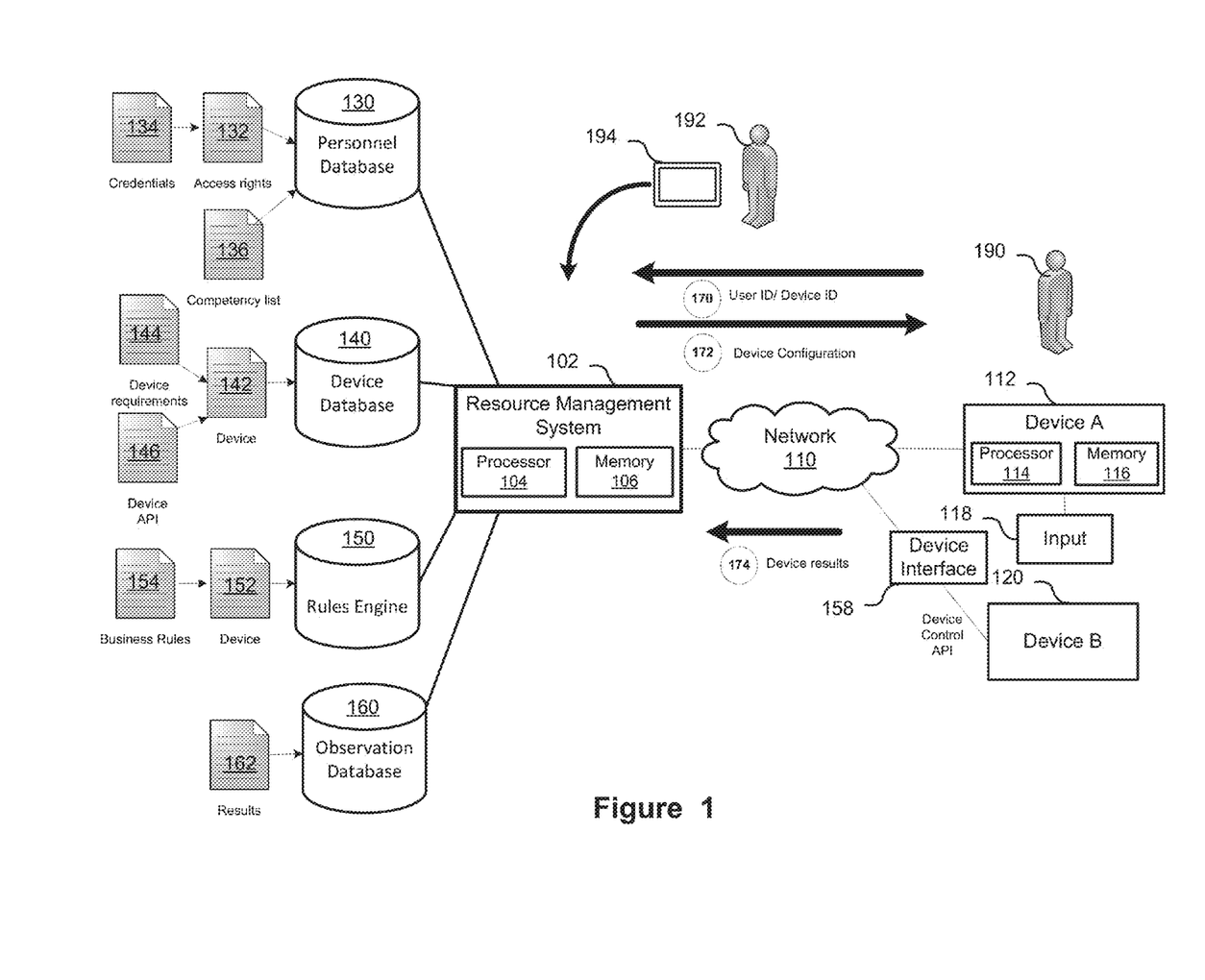
FIG. 1 shows a system for competency based device access.

FIG. 1 shows a system for enabling device configuration using user based competency verification. A resource management system 102 containing a processor 104 for executing instructions stored in a memory 106 manages device access. The resource management system 102 communicates through a network 110 with device A 112 and device B 120. Each device provides functions which require competencies of the users to be assessed or verified to enable their operation. The devices may be for example a medical instrument for diagnosis or for performing procedures, or may be for functions such as but not limited Industrial applications where the user of the device requires a level of training or competency to ensure proper usage of the device. Device A 112 has a processor 114 and memory 116 coupled to input 118. The input 118 may be an input interface such as a keyboard, touch display, voice input, haptic input or physical buttons for enabling interaction with the device. Devices may also be configured to provide feedback to the user 190 during credential entry in addition to operation of the device. The devices may be capable to communicating with other devices or access or receive data through the network 110 either directly or indirectly. The device may be further coupled to an interface 117 for communicating or translating data sent or received through the network 110 and to translate between communication protocols as required if the device is not directly network compatible. The configuration of the device may involve configuring a user interface elements, enabling or disabling features on the device, read/write/delete permissions, data collection or providing additional safety checks before performing functions on the device. The user interface elements may define menu, windows, prompts, graphics or the type of user interface presented on the device.

The user 190 accesses the device A 112 and identifies themselves by providing credentials such as a unique user identifier by an access control interface, a control access device, a card access device, pin code, username, or biometric access method. A user identifier, or credentials, and device identifier are provided through the network 110 to the resource management system 102 (170). The resource management system 102 can access a personnel database 130 which provides access rights 132 and can verify credentials 134 associated with the user ID. The personnel database 130 contains human resources related information about the employee and also houses the list of competencies and the competency levels for each employee based on demonstrated competency levels. The personnel database 130 may be integrated with a human resource management system. Once the user has been verified, based upon the determined competencies device configuration parameters (172) are sent to the device through the network. The device will now allow the user to login with a configuration level that reflects the user's competencies. Based on the user's competencies, some functions on the device may completely be disabled for the user till such a time those additional competencies are demonstrated. The features may also be associated with menus or interface functions that are display on the device.

The competencies required by the user 190 are determined from the required competency lists 136 already defined in the database. The request may also include a device identifier which is used to access a device database 140 which contains the configuration rules for each device 142 and the business rules/requirements 144 that allow access to the device which is based on competency demonstration. Each device may also require a definition of a device application programming interface (API) 146 used to control or configure the device 112. The device requirements 144 can identify the competencies and/or credentials, or parameters associated with the functions that the user 190 must have in order to perform specific functions on the device. A rule engine 150 can provide configuration or business rules 154 for the device 152 in order to define which functions may be configured or accessed on the individual device. A business rules repository 154 describes business or configuration rules which define the constraints that influence the rules engine 150 in making the decision whether to provide (or remove) access to an employee to a particular device/equipment/system. The rules may also describe constraints that can be used to grant different levels of access to a particular employee based on different criteria specified in the business rules 154. The rules engine 150 can make access decisions based on criteria such as regulations from external bodies (for e.g. Joint Commission, FDA etc), internal policies and competency checklists. The rules engine 150 configures access to the devices through device control API's. Once access has been configured, a notification can be sent to the employee about the status and level of access provided to him based on the demonstrated competencies. Alternatively the level of access may be dynamically determined when the user accesses the device. In the event of a change in the regulations or standards an update to the business rules or to the competency checklist is made by the system administrator. This change triggers the rules engine to re-assess the authorization levels for the employees and results in changing the access levels based on the latest levels of compliance. As employees demonstrate the necessary competencies, by virtue of updates to the competency checklists, the business rules engine will regenerate the access for the employees.

The resource management system 102 can then provide configuration information to the device for configuration of the processor memory or peripherals of the device. The user can then access the device based upon the restrictions provided to perform the required functions. Observations generated from the user using the device may be collected from the device or an external interface and stored within an observation database 160 (174). Observations may also be provided by an observer 192 using a computing device such as tablet 194, personal computer, or smartphone may be collected and matched to the user identifier and provided to the resource management system 102. The observation database contains usage information for a particular device and can track information such as usage time, number of error results, number of readings, and number of times a supervisor had to override, etc., in results 162. The results/observations can then be used to update competencies of the user 190. For example, the competencies may be defined against particular functions or tests performed by the user, based upon a number of hours or number of procedures that a user has performed on the device, or external observations.

The resource management system 102 can also interact with personnel database for retrieving performance or skill information associated with the user 190. The resource management system 102 may directly interact with the device A 112 alternatively; a programming interface device 158 may provide conversion between instructions from the resource management system 102 and a device B 120. The interface device 158 may also provide interface conversion allowing devices that would typically not to be networked to be accessed via the network 110. Although a dynamic rules engine is described, static rules or parameters may be configured and mapped to competency values.

Figure 2:
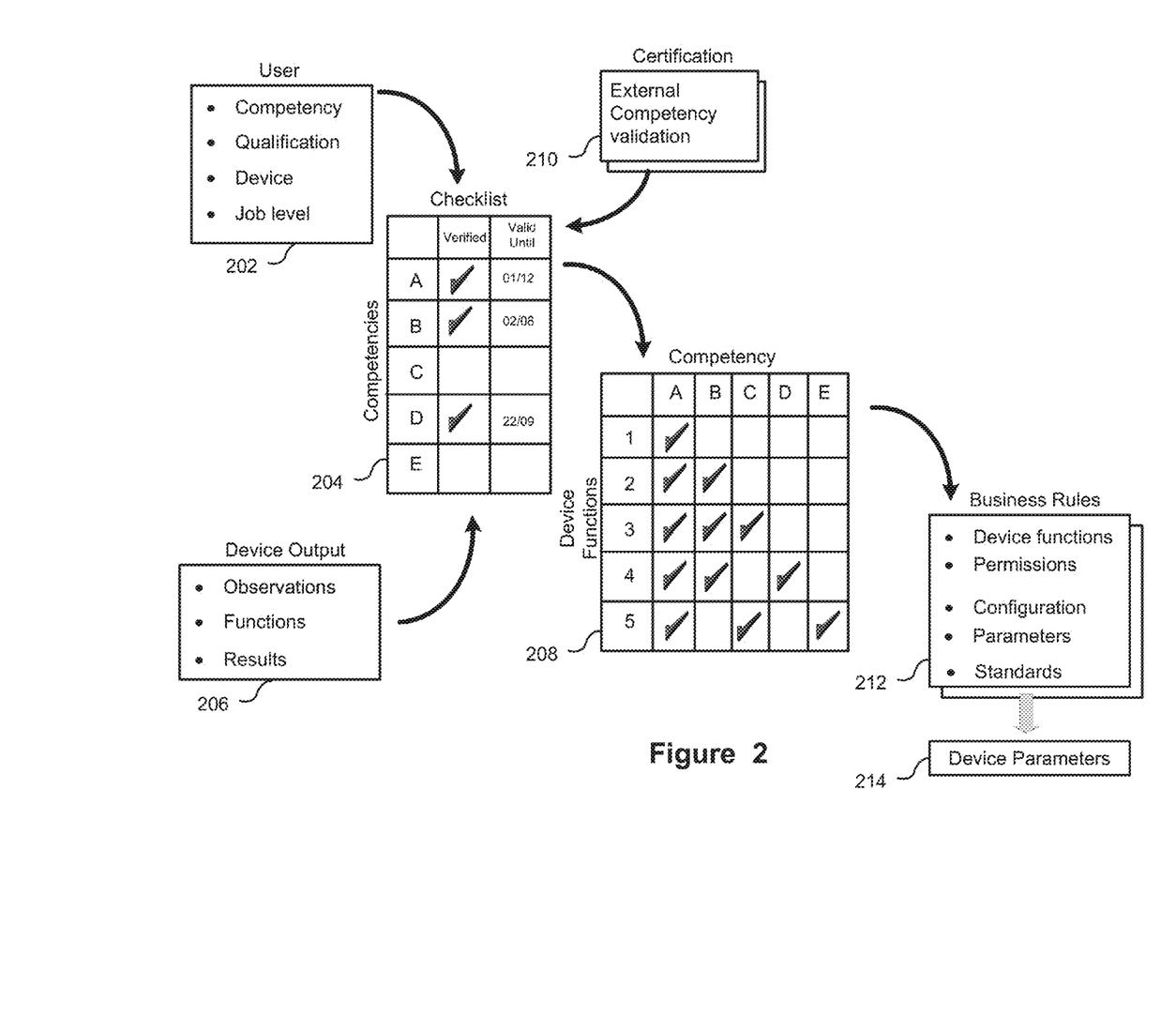
FIG. 2 shows a representation of generating and processing a competency checklist.

FIG. 2 shows a competency checklist used for providing device based access. The competency checklist 204 is used to ensure that a user meets specific competency requirements to access or control devices or functions thereon. Competencies for a user can be populated through various means. Competencies can also be demonstrated competencies that have been validated by another employee or supervisor. An employee can achieve certain competencies through learning and development activities like university courses, certification programs or based on job level. Competencies can also be built up by device usage based on the amount of time spent on the device, for example usage information is sent to the resource manager after each usage cycle by a user. Usage information like number of erroneous inputs, supervisor assists can also be used to build rules for competency advancement.

The competency list 204 defines competencies required by the user and if the user has achieved those competencies. The various levels of device access or various functions that are accessible for the device can be plotted against the different competencies in a device function-competency matrix 208. The check list 204 may identify a date by which competencies must be re-validated or must be renewed in order to maintain them. The competencies may be verified based on user certifications 202 such as defined competencies, qualifications, devices that they have used or an associate job level. The competency checklist 204 may also be associated with certification bodies that can be provided from external sources 210 that provide validation that the user has achieved a particular result, passed courses, or met accreditation requirements. For example the certifications may be confirmed by a licensing body and are provided as input into the competency checklist. Further, the competencies may be determined based upon observations or output from the device 206 based on user interaction or tasks performed. The competencies can then be mapped to device access, functions, permission levels or interfaces which can be defined in a table for a device 208. The device features that are accessible by the user are controlled based upon the competencies that have been achieved by the user. For example a user having only achieved a first competency may only have access to a single function on the device where as a person having multiple competencies such as entries A to E may have full access to the device. A user having minimum competencies may only be provided with basic device function whereas an advanced user may be provided with configuration interfaces.

The device competencies 208 can be mapped to business rules 212 to define device functions, permissions, configuration, and parameters of the device or standards used for the operation the device. The business rules can then map to device parameters 214 that are provided to the device to configure it in response to the user ID and their associated competency values. Competencies can also have an expiration period which can be tracked in the personnel database 130. Frequency of use of certain competencies can also have an effect on device access. Therefore if a user has not demonstrated a particular set of competencies for a specific time window, the device access levels can be reduced till such a time that more usage or increased frequency of competency demonstration has been provided.

Figure 3:
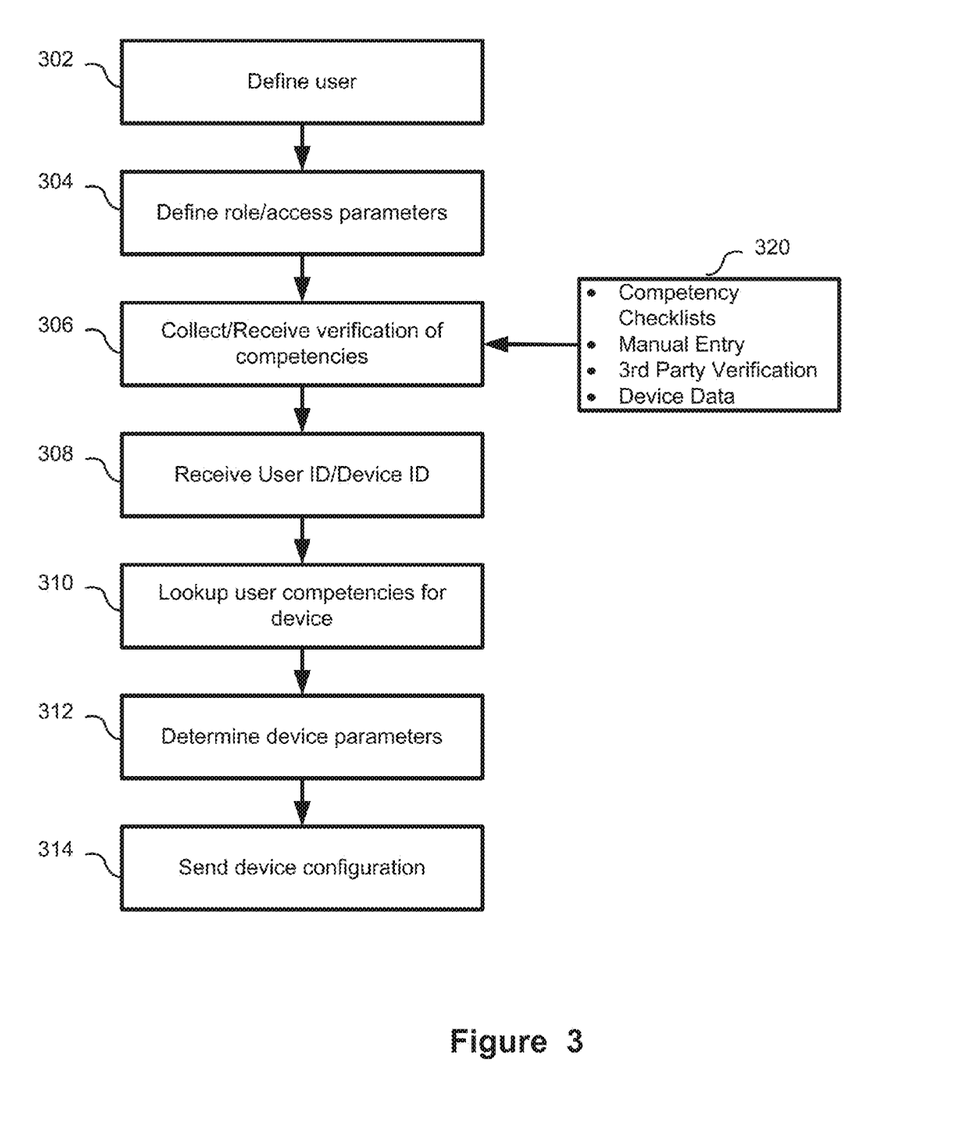
FIG. 3 shows a method of competency based device access.

FIG. 3 shows a method of configuring a device based upon user competency. The user is defined based upon a user identifier or credentials associated with a user (302). For the particular roles associated with the user access parameters can be defined for a particular device (304). Competencies for the user can then be collected or received either from the device or by external entry or input (306). The competencies may be manually entered, received from an external device entered by an observer, provided by a third party source or derived by metrics collected by the particular device, or other related devices, which the user has interacted with (320). Once the user is configured in the system, when the user interacts with the device, they are identifier to the resource management system 102 with a device identifier to query configuration parameters of the particular device (308) which define access requirements. The system can then look-up user competencies for the particular device (310) and determine the associated device parameters to configure the device (312) which can then be sent to the device (314) via the network. As part of the determination of configuration parameters an API may be utilized to determine how the device can be programmed or how intermediary devices can be interacted with to enable programming of the device. The API may define the programming interface for the device and conversion between standard access restrictions levels to device specific functions. The programming of the device may define the interface function or features that are presented to the device and identify what the user may or may not perform on the device itself. For example in a medical environment functions of an x-ray machine may be limited based upon the qualifications of the user to ensure that tasks are not performed that are outside of the competencies of the particular user. The access device configuration may be determined by the rules engine each time a user accesses a device, when business rules change, or on a periodic basis.

Figure 4:
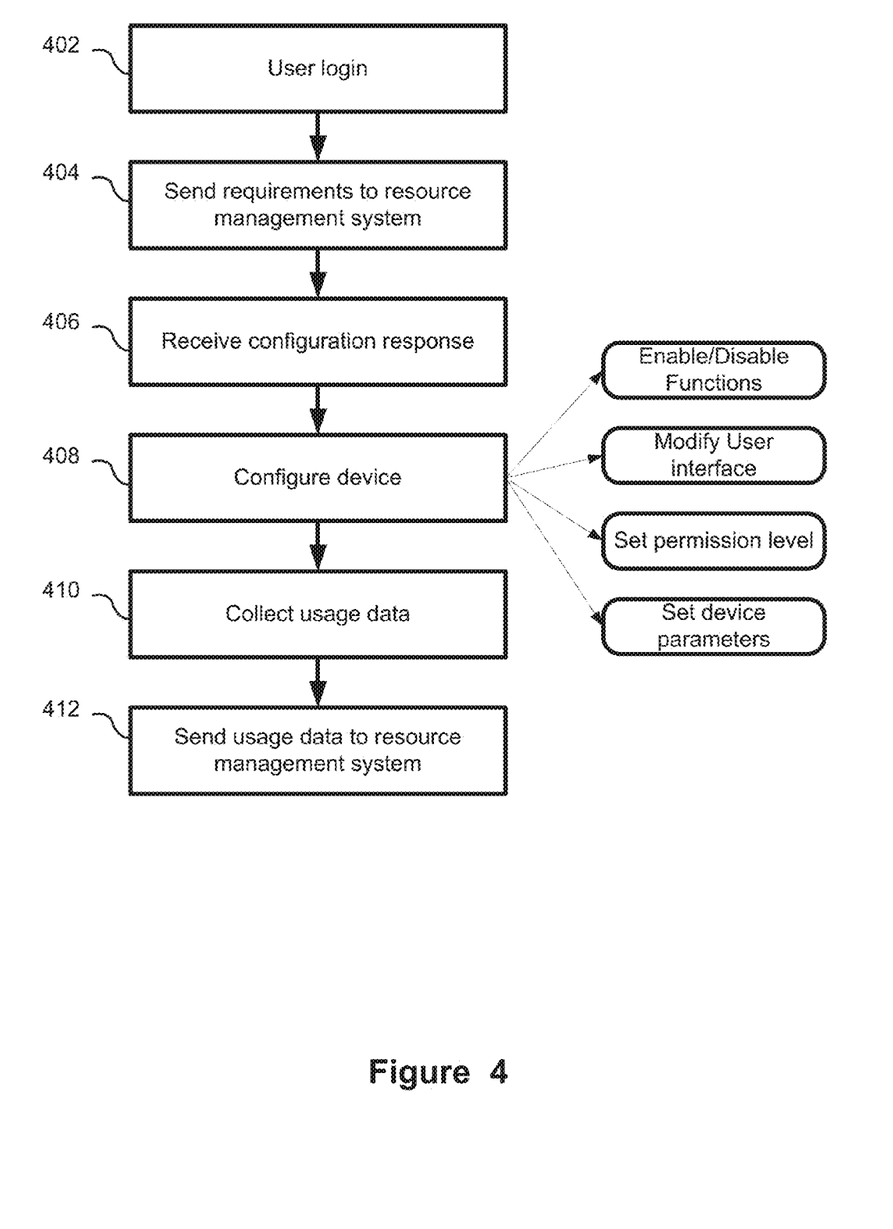
FIG. 4 shows a method of device operation using competency based device access.

FIG. 4 shows a method of using competency-based access on the device. The user logs on to the particular device or an associated access input device coupled to the device (402). The access device may be for example text biometric, radio frequency, keyboard or numeric input for the user to provide credentials to access the device. The device can then send a request to the resource management system identifying the user and device information so that the user's competencies and configuration parameters for the device can be determined (404). The device will then receive a configuration response containing device configuration parameters (406) which are then used to configure the device functions (408) to control user access to the device functions. Usage or observational data can then be collected by the device (410), or externally provided, and sent to the resource management system (412). The usage or observational data can be used to update the user competencies and performance data of the device itself. The observational data may be collected or generated by another computing device, for example a tablet, by an observer of the user using the device.

Figure 5:
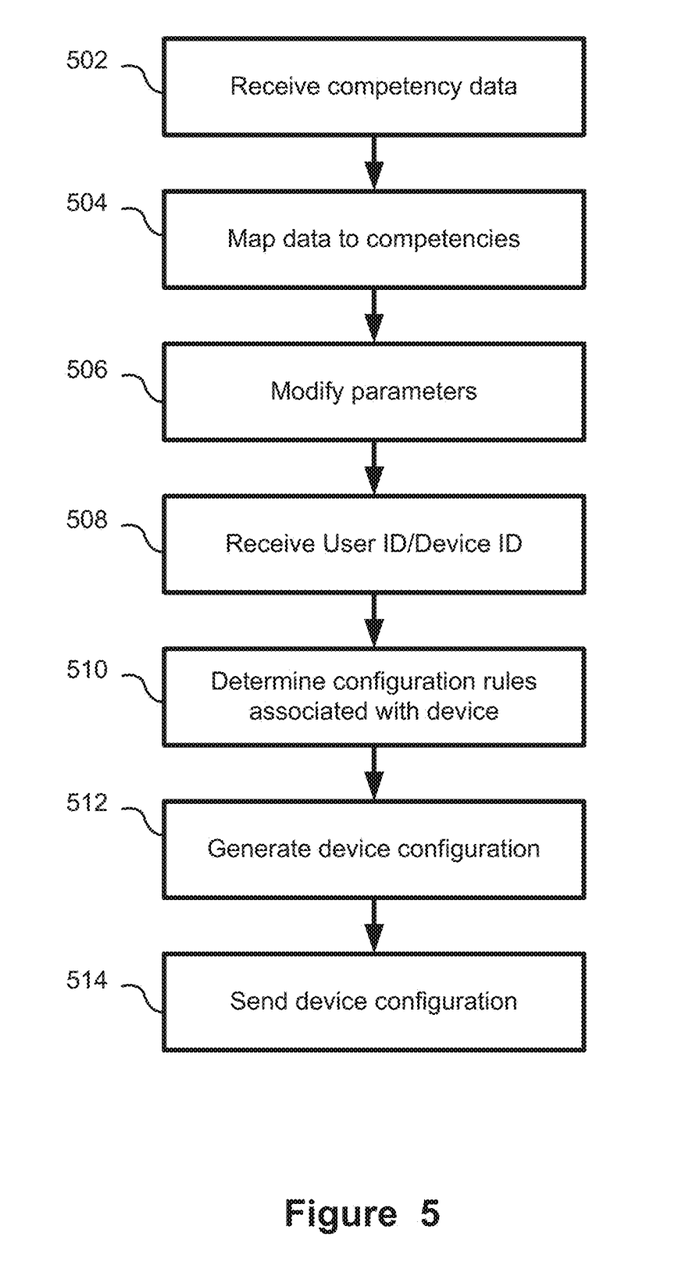
FIG. 5 shows a method of generating parameters.

FIG. 5 shows a method of generating modifying parameters for device access. Competency data is received at the resource management system (502). The competency data may be usage data, observation data or rule changes. The data may define aspects such as but not limited to time, errors, tasks or functions performed, features used, configuration parameters etc. The competency data is mapped to competencies associated with the device (504) and the competencies of the user are then modified based upon the usage data (506). The modification may increase or decrease user access, alternatively the modification may change the interface of the device or modify the display based upon determined user competencies. Subsequently, when a user ID and device ID are received at the resource management system (508) the configuration rules can be determined for the particular device (510) and parameters for the device can be generated (512). Device configuration can be sent to the device based upon the parameters (514). The parameters may be generated on a per access basis or generated as competencies or business rules are updated or changed.

Figure 6:
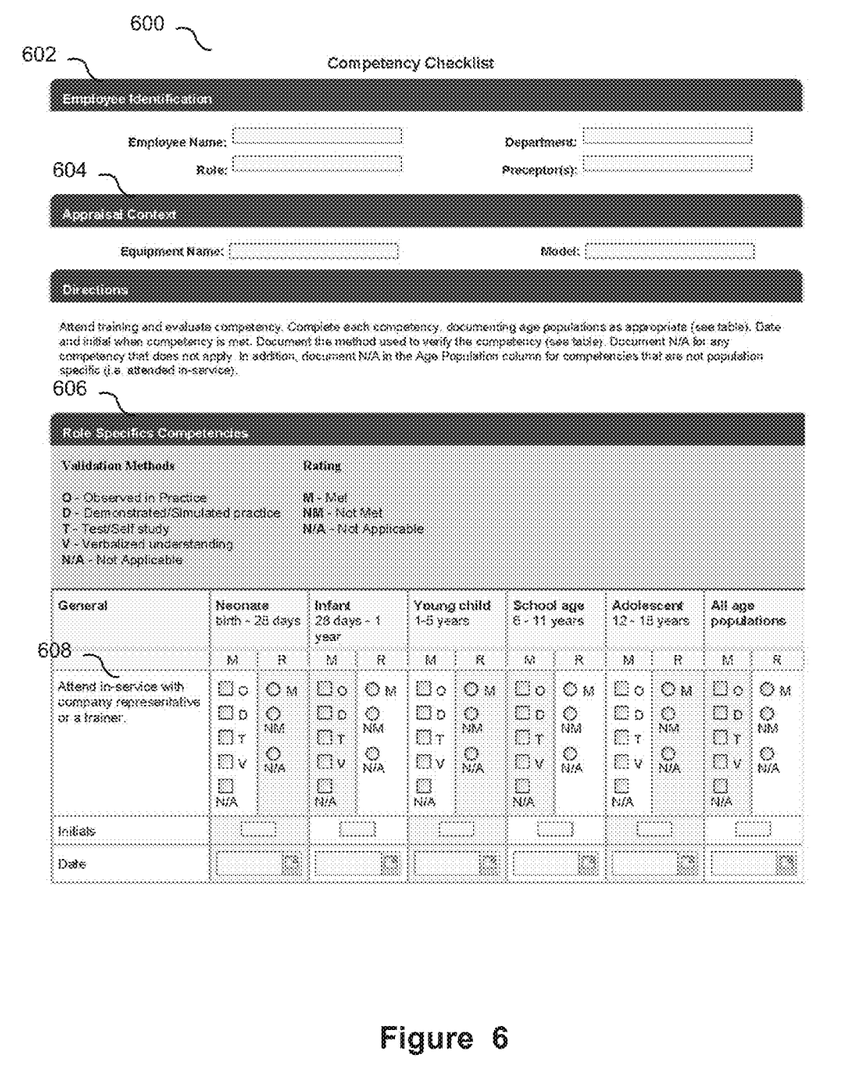
FIG. 6 shows a representation of a competency checklist.

FIG. 6 shows an example of a competency checklist 600 used to define the skills required by a particular user that are traditionally used to define user competencies. The employee is identified 602 and is associated with a piece of equipment (device) 604 under which the competencies may be determined against. A competency 608 may be rated against defined validation methods 606 used to determine the employees skill level. The results of the check list can be utilized as input 210. Portions of the checklist may be performed manually or automated by input provided by the particular equipment. The validation results can then be defined in business rules which can define parameters for configuration of the device. Features of the device may be enables when a particular competency is met (M). If a competency is not met (NM) access to the device may be reduced or modified.

It will be apparent to persons skilled in the art that a number of variations and modifications can be made without departing from the scope of the invention as defined in the claims. The method steps may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art. A non-transitory computer readable memory for execution by a processor to provide the described method, functions, modules or features.

The embodiments may be executed by a computer processor or similar device programmed in the manner of method steps, or may be executed by an electronic system which is provided with means for executing these steps. Similarly, an electronic memory medium such computer memory, CD-ROMS, Blu-Ray, Random Access Memory (RAM), Read Only Memory (ROM), flash memory, or similar computer software storage media known in the art, may be programmed to execute such method steps. As well, electronic signals representing these method steps may also be transmitted via a communication network.

The embodiments described above are intended to be illustrative only. The scope of the invention is therefore intended to be limited solely by the scope of the appended claims.

The invention claimed is:

1. A method of device access control for a medical device, the method comprising:
   receiving at a management system user credentials and a device identifier associated with a technician user of the device through a network;
   determining user competencies associated with the credentials for the technician user stored in a database of the management system, the user competencies being indicative of the technician user's experience with or training for certain functions of the medical device;
   determining configuration parameters for the medical device at the management system using the determined user competencies, the configuration parameters mapping to one or more functions of the device to restrict or permit device functionality based on the user competencies; and
   sending a device configuration from the management system based upon the determined device configuration parameters to the medical device for configuring the user interface of the medical device based upon associated user competencies, wherein the medical device is configured to enable or disable the one or more functions and associated operations of the medical device presented through the user interface of the medical device to the technician user such that the technician user is permitted to operate the medical device in certain modes based upon the determined user competencies.

2. The method of claim 1 wherein the user competencies are from a competency checklist defining one or more competencies required by the technician user of the medical device, wherein the functions of the medical device are enabled when required competencies are met.

3. The method of claim 1 wherein access to the medical device is disabled until competencies associated with the technician user are determined.

4. The method of claim 1 wherein the configuration parameters define an access level on the medical device, wherein the access level defines features available to the technician user on the medical device.

5. The method of claim 4 wherein the configuration parameters define one or more user interface elements defined within the user interface of the medical device.

6. The method of claim 1 wherein user competencies are determined based upon usage data collected from previous usage of the medical device.

7. The method of claim 1 wherein the device configuration parameters are determined using one or more rules mapping a device competency to a function of the medical device.

8. The method of claim 1 wherein the device configuration parameters are determined using one or more rules mapping a device function to an access level.

9. The method of claim 1 wherein competency assessment checklists are stored in a resource management system providing a personnel database, the personnel database defining competencies for the technician user.

10. A system for device access control comprising:
    a medical device comprising:
    a network interface coupled to a communication network;
    a memory;
    a user interface; and
    a processor coupled to the memory, the processor executing instructions from the memory for sending through the communication network a received user identifier from a technician user and a device identifier, the medical device providing functions having associated access control restrictions associated therewith wherein the user interface is configured based on the associated access control restrictions;
    a server comprising:
    a network interface coupled to a communication network;
    a memory; and
    a processor coupled to the memory, the processor executing instructions from the memory for receiving the user identifier and the device identifier from the medical device coupled to the network, the processor determining one or more parameters for configuring the medical device providing the user identifier to enable or disable functions through the associated user interface of the medical device that are presented to the technician user of the device based on the associated access control restrictions, the parameters determined based upon competencies determined for the associated technician user stored in the server, the competencies being indicative of the technician user's experience with or training for certain functions of the medical device, the competencies defining a level of skill determined for the technician user by a competency checklist, wherein access to the medical device by the technician user is disabled until competencies associated with the technician user are determined and the parameters are provided to the medical device to thereby restrict or permit device functionality based on the competencies such that the technician user is permitted to operate the medical device in certain modes.

11. The system of claim 10 wherein the competencies are determined from the competency checklist defining one or more competencies required by the technician user of the medical device, wherein the determined user competencies are mapped to one or more functions of the medical device, the functions of the device are enabled when required competencies are met.

12. The system of claim 10 wherein the configuration parameters define an access level on the medical device, wherein the access level defines features available to the technician user on the medical device.

13. The system of claim 10 wherein the configuration parameters define one or more user interface elements presented on the medical device to the user.

14. The system of claim 10 wherein the device provides usage data to the server, the usage data used to determine competencies from the technician user.

15. The system of claim 10 wherein observational data is received from a computing device, the observational data updating the competency checklist.

16. The system of claim 10 wherein the device configuration parameters are determined using one or more rules mapping a device competency to a function of the medical device.

17. The system of claim 10 wherein the device configuration parameters are determined using one or more rules mapping a device competency to an access level.

18. The system of claim 10 wherein competency assessment checklists are stored in a resource management system providing a personnel database, the personnel database defining competencies for the technician user.

19. A method of medical device access control, the method comprising:

receiving in a user interface of a device user credentials and a device identifier associated with a technician user of the medical device;

sending the user credentials and device identifier to a server coupled to a network;

receiving a response from the server identifying a permission level associated with the technician user, the permission level determined by one or more competencies demonstrated by the technician user and stored in the server required to operate the medical device, the one or more competencies being indicative of the technician user's experience with or training for certain functions of the medical device; and configuring a user interface of the medical device based upon the received permission level to enable or disable access to one or more functions associated operations of the medical device that are presented to the technician user through the user interface mapped to the one or more demonstrated competencies for the user to restrict or permit device functionality based on the one or more competencies such that the technician user is permitted to operate the medical device in certain modes.

* * * * *